United States Patent
Volken et al.

(10) Patent No.: US 12,194,721 B2
(45) Date of Patent: Jan. 14, 2025

(54) PROTECTIVE FILM REMOVING APPARATUS AND METHOD EACH FOR REMOVING A PROTECTIVE FILM FROM AN OPTICAL LENS

(71) Applicant: OptoTech Optikmaschinen GmbH, Wettenberg (DE)

(72) Inventors: Claude Volken, Balsthal (CH); Oswin Lack, Hüttenberg-Weidenhausen (DE); Ralf Vallerius, Heidenheim (DE); Sven Hänsch, Abtsgmünd (DE)

(73) Assignee: OPTOTECH OPTIKMASCHINEN GMBH, Wettenberg (DE)

( * ) Notice: Subject to any disclaimer, the term of this patent is extended or adjusted under 35 U.S.C. 154(b) by 0 days.

(21) Appl. No.: 17/831,833

(22) Filed: Jun. 3, 2022

(65) Prior Publication Data
US 2022/0388298 A1     Dec. 8, 2022

(30) Foreign Application Priority Data

Jun. 7, 2021  (EP) .................................... 21178072

(51) Int. Cl.
*B32B 43/00*     (2006.01)

(52) U.S. Cl.
CPC ........ *B32B 43/006* (2013.01); *B32B 2551/00* (2013.01)

(58) Field of Classification Search
CPC . B32B 43/006; B32B 2551/00; B24B 13/005; B24B 9/146; G02B 27/0006
See application file for complete search history.

(56) References Cited

U.S. PATENT DOCUMENTS

| 2014/0090673 A1* | 4/2014 | Atsumi | G02B 27/0006 134/153 |
| 2019/0136367 A1* | 5/2019 | Peter | C23C 14/30 |

FOREIGN PATENT DOCUMENTS

| DE | 10 2015 121682 | 6/2017 |
| EP | 2 042 265 | 11/2011 |

* cited by examiner

Primary Examiner — Alex B Efta
Assistant Examiner — Alexander S Wright
(74) Attorney, Agent, or Firm — Bauer & Joseph

(57) ABSTRACT

A protective film removal device has a first removal station for releasing a protective film from an optical lens first surface, a lens holder which has an imaginary central axis, at least one fluid nozzle having a nozzle exit duct, and a rotary mounting between the lens holder and the fluid nozzle(s). The rotary mounting is configured such that a relative movement about the central axis is able to be carried out by the fluid nozzle(s), wherein the nozzle exit duct of the fluid nozzle(s) is in each case oriented inwards. A lifting device between the lens holder and the fluid nozzle(s) is configured in such that a relative movement in relation to the lens holder, said relative movement being oriented along the central axis, is able to be carried out by the fluid nozzle(s). A method for releasing a protective film from a lens surface is also disclosed.

14 Claims, 6 Drawing Sheets

PROTECTIVE FILM REMOVING APPARATUS AND METHOD EACH FOR REMOVING A PROTECTIVE FILM FROM AN OPTICAL LENS

The invention relates to a protective film removing device and a method of releasing at least one protective film from an optical lens.

Spectacle lenses are in particular produced from optical lens blanks. Although individual optical faces have to be produced herein in order to correct defective vision of people, the manufacturing is similar to mass production. It is only in this way that the spectacle lenses can be produced in a cost-effective manner. Because the production of optics in the classic fashion is a handicraft and a high degree of flexibility is still required for producing the required optical faces, numerous machines for carrying out individual operating steps in an automated manner exist in the prior art, such as, for example, grinding machines, turning machines, polishing machines and coating machines. However, manual operating steps continue to be carried out between these automated operating steps.

One of these operating steps relates to peeling off protective films which are applied to a first lens face of an optical lens blank, so that the second lens face can be machined without damaging the first lens face in the process. For peeling off, an operator takes a pointed tool in order to lift the masking film and to thereafter peel off the latter. However, this is time-consuming and moreover leads to scratches on the surface of the lens blank. This results in an increase in the reject rate.

From DE 10 2015 121 682 A1 it is known to release a protective film from a lens surface in that this protective film is gripped in a region in which the lens surface bridges a clearance in the lens surface. Thereafter, the protective film is mechanically peeled off. It is disadvantageous herein that the clearance has to be configured before the protective film is applied. This in order to be able to grip the latter thereon at all later.

A method for releasing a protective film from a lens, in which method the lens is rotated while hot fluid is sprayed from the circumference towards the lens by a single nozzle with a variably inclined fluid jet (corresponding to a dirt blaster of a high-pressure washer) is known from EP 2 042 265 B1. The protective film is heated and the adhesive of the protective film becomes soft as a result of the conical hot pressurized jet which varies in terms of the angle. Ultimately, the adhesive of the protective film melts to the extent that the protective film is released on the circumference thereof, this being facilitated by the pressurized jet. Subsequently, the protective film continues to be released as a result of being facilitated by the pressure of the fluid jet. Disadvantageous herein is the remnant of melted adhesive on the lens face that has to be removed in a subsequent process. Moreover, a large quantity of hot fluid is required which, by virtue of being sprayed in a conical manner, has a large surface in relation to the environment. Therefore, much thermal energy is lost to the environment and said lost thermal energy has to be correspondingly reintroduced. Moreover created is a large quantity of highly humid air which exits into the factory buildings. A lot of energy is invested even when the method is operated in a fluidic circuit, and fresh fluid has to be constantly topped up to replace the evaporated fluid.

Therefore, it is an object of the invention to provide a device and a method by way of which a protective film can be removed in an efficient and effective manner, and ideally without remnants of adhesive, from a lens surface. Both, the device and the method, are intended to permit a high degree of automation. The solution here is to be easy to implement and cost-effective.

The invention relates to a protective film removal device having a first removal station for releasing a protective film from a first lens surface of an optical lens (including also lens blanks that have not been machined and partially machined), having a lens holder, in particular for receiving the optical lens, wherein the lens holder has an imaginary central axis which, in particular when an optical lens is received, is oriented so as to be transverse to the first lens surface. Moreover, the first removal station has at least one fluid nozzle having a nozzle exit duct. Furthermore, the protective film removal device has a rotary mounting between the lens holder (on the one hand) and the fluid nozzle or fluid nozzles (on the other hand), wherein the rotary mounting is configured in such a manner that a relative movement about the central axis is able to be carried out by the fluid nozzle or fluid nozzles, wherein the nozzle exit duct of the fluid nozzles is in each case oriented inwards (in particular in terms of the rotary mounting).

According to a special development of the invention, a lifting device between the lens holder and the fluid nozzle or fluid nozzles is configured in such a manner that a relative movement in relation to the lens holder, said relative movement being oriented along the central axis, preferably so as to be at least substantially parallel and particularly preferably parallel to the central axis, is able to be carried out by the fluid nozzle or fluid nozzles. The advantage of the lifting device lies in that the fluid jet or the fluid jets of the fluid nozzles can be guided about the circumference, on the one hand, and additionally can be adjusted in terms of the height position of said fluid jet or fluid jets, this being performed continuously, slowly, quickly, in an oscillating manner, abruptly or harmonically, for example. In this way, the fluid jet can not only be directed onto the lens circumference about the circumference, but also be adjusted in a targeted manner to the height positions in which the best possible releasing effect for the protective film is achieved. This in particular takes into account that the optional impact point of the fluid is displaced as the protective film is successively released. Precise, local releasing of the protective film is successfully performed by means of the lifting device. Instead of operating with a voluminous fluid jet, by virtue of the lifting device it is sufficient to utilize a substantially finer fluid jet. Fluid and energy are saved as a result. The protective film can be, in particular, a plastic film, for example a self-adhesive plastic film.

Optionally, the lifting device may have a lift drive. In this way, the lifting movement is able to be performed individually. The lift drive is preferably a pneumatic lifting cylinder or an electric motor, for example an electric linear motor or a spindle drive. A pneumatic lifting cylinder acts comparatively quickly, while very precise actuating movements and actuating movements at defined accelerations are able to be carried out using the electric motor. In this way, the target position can be approached with particular precision. Moreover, the optional oscillating movements can be carried out using particularly small actuation distances. To this end, the position of the upper glass edge of the optical lens is preferably known. As a result, the optional oscillation along the glass edge can be minimized, and in this way a maximum in terms of efficacy of the fluid jet or the fluid jets can be achieved.

A mechanical correlation gear, by way of example a cam gear, which couples the lifting movements of the lifting device to the rotating movement of the rotary mounting would be a more cost-effective alternative to the lift drive.

In another or additional development of the invention, the nozzle exit duct or nozzle exit ducts is/are in each case configured in such a manner that said duct/ducts generate an at least substantially straight, in particular cylindrical, and in particular laminar, jet of fluid. The use of such a jet permits the release of the protective film to be simulated in a manner substantially easier than in the case of turbulent jets such as in a dirt blaster, and fluid and energy to be optimized in terms of the resources used. As opposed to such a jet having a variable inclination, the straight jet can be finely oriented onto the separation line between the optical lens and the protective film. In variants with more than one fluid nozzle, the fluid jets of the fluid nozzles can optionally have the same or a different diameter. Identical diameters are particularly suitable in particular when the rotation angle is configured such that each fluid nozzle is responsible for releasing the protective film in a defined rotation angle range. In the case of comparatively large rotation angles, advantages can be achieved with different diameters of the fluid jets, because in this instance a plurality of nozzles machine the same angular range of the optical lens, and different diameters of the fluid jets are associated with different active forces on the protective film, said forces being able to complement one another.

According to an optional design embodiment, the lens holder is disposed so as to be rotationally fixed, in particular rotationally fixed relative to a machine frame, and the fluid nozzle or the fluid nozzles is/are in each case disposed so as to be rotatable about the rotary mounting, in particular so as to be rotatable relative to a or the machine frame. This results in a nozzle carousel, so to speak, by way of which the fluid nozzles are rotated about the lens holder. Such a design embodiment offers advantages above all when even more tools than the fluid nozzle are to machine the statically disposed lens.

In one special embodiment, the lens holder has a receptacle face on which the optical lens, in particular in the received state, bears. Holding the lens from the rear side causes least disturbance for the fluid jets which should have free access to the lens circumference. Alternatively or additionally, however, a holder which grips the optical lens on the lens circumference is also considered.

Optionally, at least one suction duct can open out through the receptacle face, in particular so as to fix the optical lens on the receptacle face by way of negative pressure. A vacuum mounting (or negative-pressure mounting) can be provided as a result. This is particularly gentle on surfaces which may already be optically effective. Herein, the suction duct can especially be connected to a negative-pressure pump. Rapid and automated fixing of the optical lens on the lens holder by suction is achieved in this way.

The lens holder can be held from sides of the rotary mounting, laterally or from the side opposite the rotary mounting. A connection to the machine frame from sides of the rotary mounting permits a free relative rotational movement between the lens holder and the fluid nozzles. Lateral holding simplifies the loading and unloading of optical lenses on and from the lens holder. In contrast, holding from the side opposite the rotary mounting is able to be implemented favourably in terms of free rotation and loading and unloading. Required for this purpose, however, are optionally holding elements between the optical lens and the fluid nozzles, said holding elements configuring a minor spray shadow on the circumference around the lens because said holding elements are disposed between the fluid nozzle or fluid nozzles and the optical lens.

According to a further optional development of the invention, the nozzle exit duct or nozzle exit ducts is/are in each case fed with fluid by way of an infeed, in particular a common infeed, wherein a conveying pump, in particular a common conveying pump, and/or a cooling device, in particular a common cooling device, for cooling the fluid is/are disposed in the infeed. The use of a common conveying pump is cost-efficient. A cooling device has the advantage that unintentional heating of the fluid can be prevented even in the case of unfavourable ambient temperatures, for example in factory buildings that are not air conditioned. In this way it can moreover be prevented that the adhesive of the protective film melts and remnants thereof remain on the lens face. The cooled fluid contributes towards the adhesive bonding on the protective film being released. The portion starting from the exit of the fluid nozzles should optionally also be associated with the infeed, in particular when a return of the fluid for re-use is provided. The cooling device can be configured as a passive heat exchanger. In order to be independent of environmental parameters, the alternative in which the cooling device has a chiller or a heat pump is expedient. The waste heat of the fluid can optionally be utilized, for example by a fan for blow-drying the lens after the protective film has been released.

In one particular embodiment, a collection vessel in which fluid exiting the fluid nozzles is accumulated is disposed in the infeed. As a result, the fluid can be repeatedly used. A filter is preferably disposed in the infeed. In this way, dirt particles such as machining remnants which may adhere to the optical lens before the protective film is released can be removed from the fluid.

Furthermore, the nozzle exit ducts can in each case point in the direction of the central axis. In this way, said nozzle exit ducts impact the lens circumference, or the separation line between the lens surface and the protective film, without an angle of attack in the circumferential direction. This angle has proven particularly effective for releasing the protective film.

In particular, the nozzle exit duct or nozzle exit ducts, with the exception of the rotary mounting, can in each case have a static angle, in particular relative to the central axis. In this way, the device manages with few drives, even when a plurality of fluid nozzles are provided. The nozzle exit duct, or the nozzle exit ducts, preferably point/points slightly obliquely from above in the direction of the lens holder and/or the receptacle face 11 thereof. Furthermore, the angle between an orientation plane, which is oriented so as to be perpendicular to the central axis, and the nozzle exit duct or nozzle exit ducts is preferably between −5 degrees and 50 degrees, furthermore preferably between 0 degrees and 40 degrees, and particularly preferably between 5 degrees and 35 degrees.

The rotary mounting preferably has a rotation axis that is oriented so as to be coaxial with the central axis. In this way, a constant spacing of the fluid nozzles from circular lens circumferences is achieved, this being the most widely used embodiment of lens blanks.

It is practical for the rotary mounting to be disposed on that side of the lens holder that points away from the receptacle side of the optical lens. In this way, there is free access for loading and unloading the lens holder. In one preferred embodiment the rotary mounting in geodetic terms lies below the lens holder. In this way, the optical lenses can be simply inserted from above, and states of the lens holder in which no fixing is active (e.g. power failure, work interruption, transfer times when loading and unloading the lens holder, etc.) are not critical.

The rotary mounting preferably has a rotary drive. This permits active driving so that the fluid jets can be applied so as to be precisely controlled above the circumference of the optical lens. The rotary drive preferably has an electric motor. A rotating movement resulting from the impulse of the fluid jets would be a conceivable alternative to the rotary drive, for example.

According to an optional refinement, the rotary mounting has a rotary bearing and thereon a cantilever arm or a disc, wherein the fluid nozzle or the fluid nozzles is/are in each case established on the cantilever arm or the disc. As a result thereof, a small rotary bearing can be used in the centre, and the fluid nozzles can nevertheless be disposed so as to be remote from the centre.

A further additional or alternative development of the invention can lie in that the rotary mounting has a delimited rotating range, wherein the rotating range is preferably less than 360 degrees, and wherein a rotary drive having a direction reversal switch is preferably provided, in particular so as to pivot the fluid nozzles and the lens holder, or the optional receptacle face thereof, in a mutually relative reciprocating manner with a rotating direction reversal. In this way, lesser load requirements in terms of rotatability are set, this also being in particular associated with various rotary feedthroughs by way of which the fluid can be transported to the fluid nozzles, for example. The use of flexible hoses, for example, instead of rotary feedthroughs can also be considered in the case of delimited rotation angles.

In one particular embodiment the lens holder is disposed so as to be fixed in terms of the height position, in particular while releasing the protective film, and in particular fixed in terms of the height position relative to a machine frame, and the fluid nozzles are driven by the lifting device so as to be movable along the central axis, in particular so as to be movable relative to a machine frame. In this way the tools, specifically the fluid nozzles, are the part that is movable in terms of height and is able to be oriented towards the workpiece, specifically the optical lens. Optionally however, the mounting can also be embodied so as to be reversed.

An optional variant lies in that the rotary mounting is disposed between the lifting device, on the one hand, and the fluid nozzle or fluid nozzles, on the other hand. In this instance, the rotary mounting is moved conjointly with the lifting device. Alternatively, the arrangement could also be reversed, the lifting device could thus be disposed between the rotary mounting, on the one hand, and the fluid nozzles, on the other hand. In this instance, the lifting device is part of the rotating mass.

The protective film removal device optionally has exactly two, or at least two, or exactly three, or at least three, fluid nozzles. Two, three or more fluid nozzles contribute towards fewer relative revolutions between the optical lens and the fluid nozzles being required for removing the protective film. Here, the variants having exactly two or exactly three fluid nozzles are the preferred numbers for cost reasons.

According to a further additional or alternative development of the invention, the protective film removal device has exactly two or at least two fluid nozzles, wherein one of the two fluid nozzles is disposed so as to be offset from the other of the two fluid nozzles by a defined rotation angle about the central axis. The speed of the release of the protective film is increased in this way. The rotation angle can be between 10 and 180 degrees, for example, is preferably between 20 and 90 degrees, and particularly preferably between 30 and 60 degrees. With the aid of the two fluid nozzles disposed so as to be offset it can be achieved that 360 degrees of the lens circumference can be swept even if the rotating range of the rotary mounting is less than 360 degrees.

Optionally, the two fluid nozzles can be fixedly connected to one another so that a rotary mounting between the lens holder, on the one hand, and the two fluid nozzles, on the other hand, is configured in such a manner that a relative movement about the lens holder can be carried out by the two fluid nozzles, wherein the nozzle exit ducts are oriented inwards. Accordingly, the plurality of fluid nozzles can share the rotary mounting, rotary drives, lifting devices, the infeed and the like. Accordingly, it is possible for the plurality of fluid nozzles to be synchronously operated. This keeps the construction simple and the costs low. In particular, the fluid nozzles can at least partially or completely share the infeed, herein in particular at least partially or entirely the conveying pump, the collection vessel and/or the cooling device. Optionally, the fluid nozzles are at least substantially configured so as to be of an identical construction.

Additionally, the protective film removal device can have a fan for blow-drying the optical lens.

Furthermore, the protective film removal device can have a wiping device which is in particular designed in such a manner that the first lens face of the optical lens received in the lens holder is able to be wiped with a wiping tool.

A particular embodiment of the invention lies in that the protective film removal device has a second removal station for, simultaneously with the first removal station, releasing a protective film from a lens surface of a second optical lens. The potential throughput in terms of lenses to be machined is doubled as a result. The first and the second removal station here can share a loading and unloading device, the infeed (in particular up to a manifold), the conveying pump, the collection vessel, the protective cabin, a control unit and/or the cooling device.

Optionally, the second removal station can likewise have the optional features of the first removal station. In this way, this second removal station can have a lens holder, in particular for receiving the second optical lens, wherein the lens holder has an imaginary central axis which, in particular when a second optical lens is received, is oriented so as to be transverse to the first lens surface, and at least one fluid nozzle, wherein each of the fluid nozzles has a nozzle exit duct. A rotary mounting between the lens holder and the fluid nozzle or fluid nozzles is configured in such a manner that a relative movement about the central axis is able to be carried out by the fluid nozzle or fluid nozzles, wherein the nozzle exit duct of the fluid nozzles is in each case oriented inwards (in particular in terms of the rotary mounting). In a manner corresponding to the already described development of the first removal station, this development can also be configured in the second removal station, specifically in that a lifting device between the lens holder and the fluid nozzles is configured in such a manner that a relative movement in relation to the lens holder, said relative movement being oriented along the central axis, preferably so as to be at least substantially parallel, and particularly preferably parallel to the central axis, is able to be carried out by the fluid nozzle or fluid nozzles. The advantages correspond to those of the first removal station, wherein numerous machine components can moreover be shared, as mentioned.

In particular, the second removal station can have one or a plurality of the optional features of the first removal station. Here too, the respective advantages of the first removal station result in an analogous manner. In this way, it is in particular also possible to implement that the second removal station is configured so as to be at least substantially identical in terms of features or even so as to be of an identical construction, as the first removal station.

The invention moreover relates to a method for releasing a protective film from a first lens surface of an optical lens by at least one fluid nozzle, wherein the optical lens has a second lens surface that lies opposite the first lens surface, wherein the first and the second lens surface are delimited on a lens circumference, and wherein the optical lens has a lens axis. A method step according to the invention lies in carrying out a relative rotating movement of the fluid nozzle or the fluid nozzles about the lens circumference, and superimposing the relative rotating movement by a relative lifting movement of the fluid nozzle or the fluid nozzles in particular in relation to the optical lens, said relative lifting movement being oriented along the lens axis, preferably at least substantially parallel, and particularly preferably parallel, to the lens axis, wherein the fluid nozzle or the fluid nozzles directs/direct (in each case) onto the entity composed of the optical lens and the protective film a straight fluid jet that is oriented inwards. The rotating movement and the lifting movement permit the fluid jet to be steered precisely into the separation zone between the protective film and the first lens face and the protective film to be successively released. For the use of different protective films and lens sizes, the rotating movement and the lifting movement can be individually optimized such that switching between different movement profiles can also take place at short notice, thus for example by way of electronically stored movement profiles.

According to one optional design embodiment of the method, the lifting movement takes place in an oscillating manner, and the fluid jet or fluid jets are steered in an oscillating manner across a separation line between the protective film and the first lens surface, wherein in particular the separation line, by virtue of the protective film being successively released, is continuously displaced towards the lens axis. As a result, the protective film is in particular lifted and is successively separated from the first lens surface until the protective film is finally removed from the first lens surface. This is comparable to a scraper (made of fluid) which is pushed several times from the lens face (i.e. the lens circumference or the lens surface) in the direction of the protective film. For example, the lifting movement could be modulated in the manner of a sine wave. By virtue of the displacing separation line, the position of the zero point of the lifting movement can track the separation line.

In a special configuration of the method, the rotating movement has a rotating direction reversal, and the fluid nozzle or the fluid nozzles pivots/pivot in a reciprocating manner between two terminal points. The rotating direction reversal facilitates the release of the protective film, because this results in somewhat variable forces from the fluid jet acting in an alternating manner on the protective film and the adhesive of the latter.

The number of lifting movements (or of the lifting direction reversals) should exceed the number of rotating direction reversals, preferably at least by a factor of three. As a result, the separation zone is more frequently impacted by the traversing fluid jet and the protective film in the process is repeatedly raised such that said protective films tugs at the separation zone and causes peeling by tensile and shear forces.

A first rotation angle between the two terminal positions is preferably less than 360 degrees, wherein exactly two or at least two fluid nozzles are provided and one of the two fluid nozzles is disposed so as to be offset from the other of the two fluid nozzles by a defined second rotation angle, wherein the second rotation angle is more than 360 degrees minus the first rotation angle. As a result of the fluid nozzles being disposed in an offset manner, the entire lens circumference of the optical lens is swept, despite the nozzles pivoting less than 360 degrees. Additionally, the respectively trailing fluid nozzle facilitates the separation procedure in that said trailing fluid nozzle once again performs work directly in the separation zone prepared by the leading nozzle.

It can optionally be provided that a fluid of the fluid jet or the fluid jets is cooled in an infeed ahead of the first and/or second fluid nozzle, in particular to below 40 degrees, preferably to below 37 degrees, furthermore preferably to below 33 degrees, and particularly preferably to a temperature which is below the melting temperature of an adhesive of the protective film. In the case of the cooling of the fluid being implemented, it is achieved even at unfavourable ambient temperatures, for example in factory buildings that are not air conditioned, that the melting temperature of the adhesive is undershot so that no melted remnants of the adhesive of the protective film remain on the first lens surface.

A height oriented so as to be parallel to the lens axis, or the diameter of the fluid jets, is in each case preferably smaller than the maximum spacing, and preferably smaller than the minimum spacing, between the first and the second lens surface. Such a fine fluid jet contributes towards precision, efficiency and resource management. In simple terms, the optical lens in this instance is thicker than the jet.

The fluid jet or the fluid jets preferably has/have a circular cross section. Moreover, it is preferable for the fluid jet or the fluid jets to be configured so as to be cylindrical and/or laminar, in particular by way of a corresponding configuration of the fluid nozzles. In this way, a compact, high-energy jet can be directed precisely onto the separation zone between the protective film and the optical lens.

Furthermore, the fluid jets, with the exception of the rotating movements of the fluid nozzles, should have a constant orientation as well as a constant inclination in terms of the lens axis. Steep angles of attack of the fluid jet in the separation zone between the optical lens and the protective film are ineffective. As the lens curvature is comparatively flat, the angle of impact varies only slightly during the displacement of the separation line when successively releasing the protective film. It would be possible to additionally compensate for this minor angular variation, but this is complex in terms of implementation.

Optionally, the method can be carried out using a protective film removal device as described above and hereunder. The resultant advantages of the individual device features can thus also be realized in the method.

Furthermore, the person skilled in the art is free to expediently integrate the individual device features in the method, and conversely to implement constructive measures from the requirements of the method in the protective film removal device.

Further features, details and advantages of the invention will become apparent from the wording of the claims and from the following description of exemplary embodiments with reference to the drawings. In the drawings:

Figure 6A:
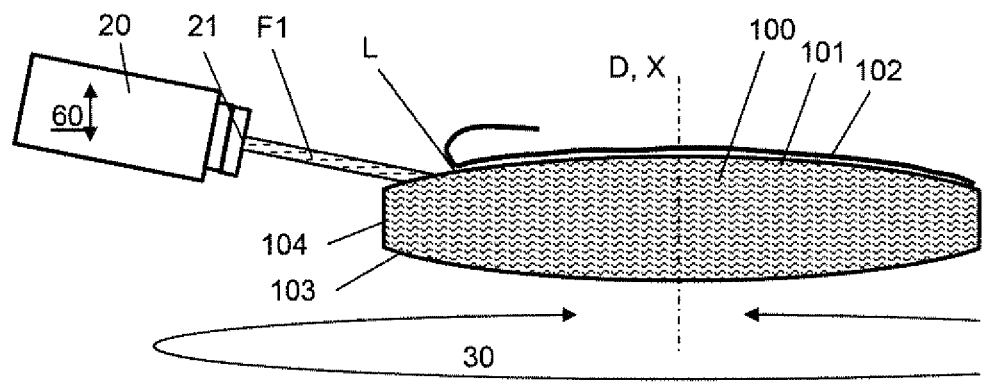
Figure 6B:
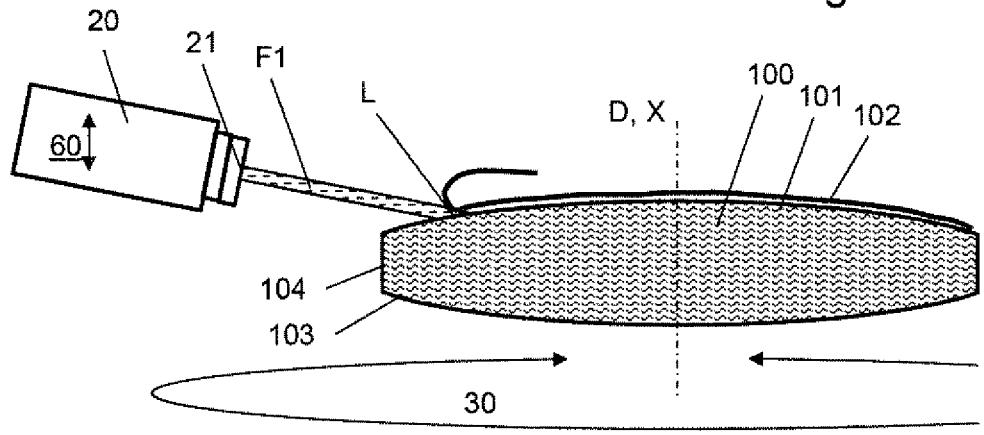
Figure 6C:
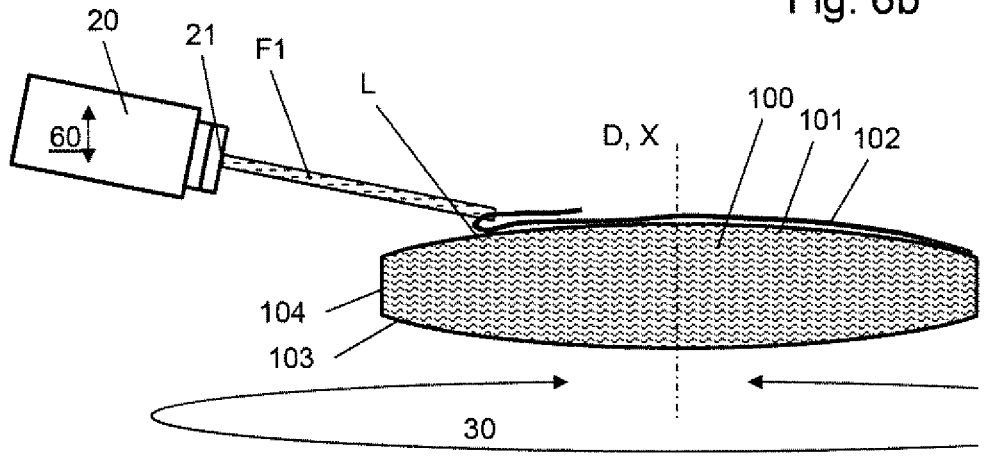

FIGS. 6a-c show a schematic illustration of releasing the protective film from a lens surface by a fluid jet which is driven by a lifting device.

Figure 1:
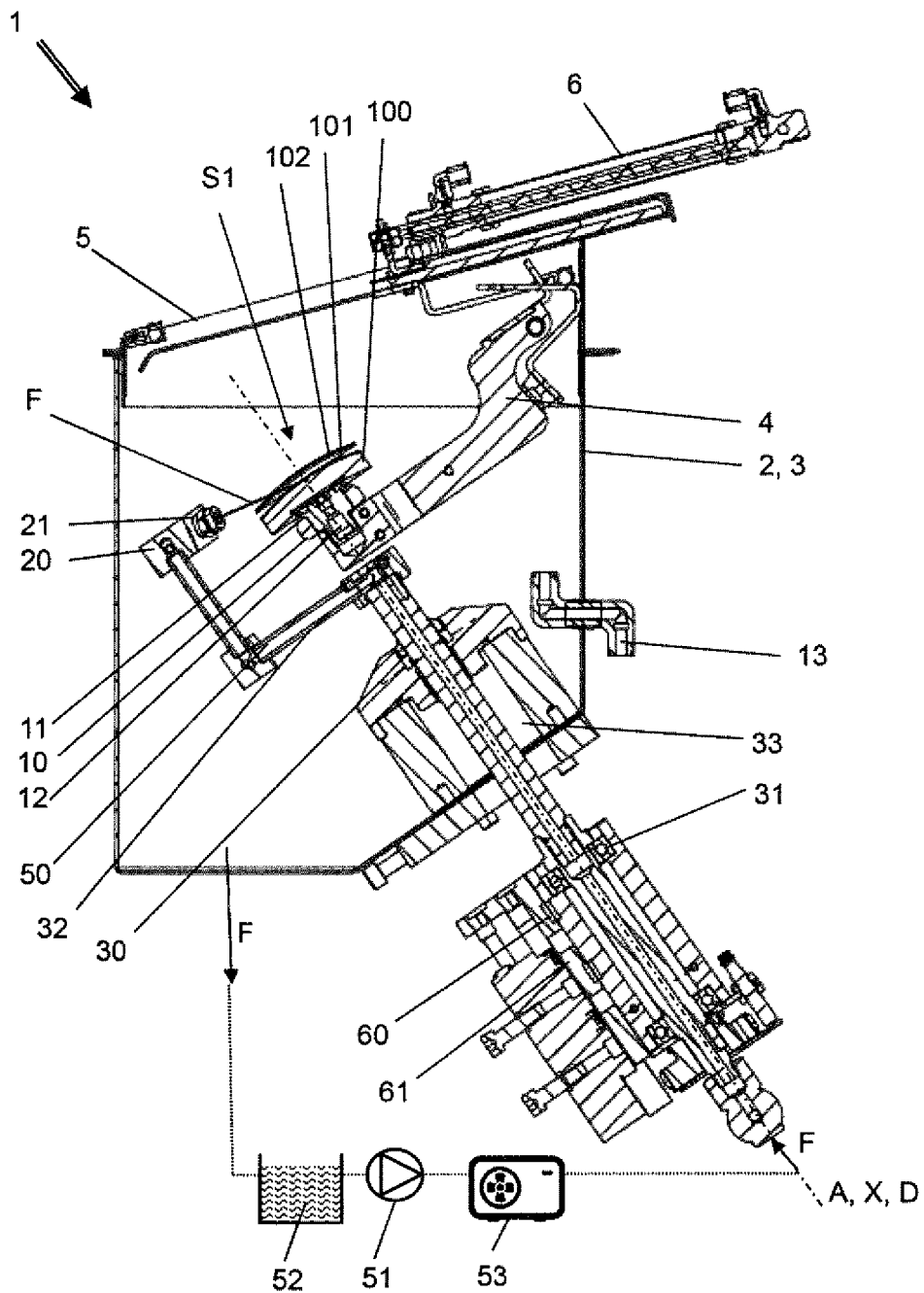
FIG. 1 shows a section through a protective film removal device.

FIG. 1 shows a section through a protective film removal device 1 having a first removal station S1 for releasing a protective film 102 from a first lens surface 101 of an optical lens, or of a lens blank 100 that has not been machined or partially machined (hereunder simply optical lens 100). The protective film 102 is a plastic film which is fixed to the first lens surface 101 by an adhesive, in particular a self-adhesive plastic film of the protective film 102.

The protective film removal device 1 has a lens holder 10 in which such an optical lens 100 is received. Said lens holder 10 is pivotably disposed on a pivot arm 4 in a housing 3 of a machine frame 2. The pivot arm 4 is part of a loading and unloading device (see reference sign 7 in FIG. 3) and can move the optical lens 100 between the machining position illustrated in the proximity of a housing opening 5 where the optical lens 100 can then be retrieved from the housing 3 by a mechanical gripper or suction gripper of the unloading device, for example. The housing opening 5 possesses an automatic closure element 6.

The lens holder 10 possesses an imaginary central axis A which is oriented so as to be coaxial with a lens axis X and transverse to the first lens surface 101. The lens holder 10 here is disposed so as to be rotationally fixed relative to the machine frame 2, in particular while the protective film 102 is being released. The optical lens 100 bears on a receptacle face 11 of the lens holder 10, a suction duct 12 for fixing the optical lens 100 on the receptacle face 11 by vacuum opening out through said receptacle face 11. The suction duct 12 is connected to a negative pressure pump 13 which sits outside the housing 3 (the hose connection between the housing feedthrough and the pivot arm 4 is not illustrated).

Moreover, the protective film removal device 1 has a fluid nozzle 20 having a nozzle exit duct 21 which from the outside is oriented inwards in the direction of the central axis A. Said nozzle exit duct 21 here from above points so as to be slightly inclined in the direction of the first lens surface 101. The nozzle exit duct 21 otherwise has a static angle relative to the central axis A. The nozzle exit duct 21 is configured in such a manner that the latter generates an at least substantially straight, cylindrical and preferably ideally laminar jet of fluid F.

The nozzle exit duct 21 is fed with fluid F by way of an infeed 50, wherein a conveying pump 51 and a cooling device 53 for cooling the fluid F are disposed in the infeed 50. The portion starting from the exit from the fluid nozzle 20 is also associated with the infeed 50, since the entire fluid is conveyed in the circuit. To this end, the housing 3 collects the fluid F and directs the latter to a collection vessel 52 of the infeed 50.

A rotary mounting 30 is disposed between (in mechanical rather than locational terms) the lens holder 10 and the fluid nozzle 20 so that the fluid nozzle 20 is rotatable about the rotary mounting 30, and in particular rotatable relative to the machine frame 2. The rotary mounting 20 is configured in such a manner that a relative movement about the central axis A is able to be carried out by the fluid nozzle 20, wherein the nozzle exit duct 21 of the fluid nozzle 20 is oriented inwards in the direction of the central axis A. To this end, the rotary mounting 30 has a rotation axis D which is oriented so as to be coaxial with the central axis A and the lens axis X. The rotary mounting 30 presently is geodetically disposed below the lens holder 10 and the receptacle face 11 of the latter, and has a rotary drive 33 in the form of an electric motor.

The rotary mounting 30 furthermore possesses a rotary bearing 31 by way of which a cantilever arm 32 is rotatably mounted, wherein the fluid nozzle 20 is established on the cantilever arm 32. In mechanical terms, the rotary mounting 30 lies between a lifting device 60, on the one hand, and the fluid nozzles 20, on the other hand. In this way, the rotating parts are raised and lowered by the lifting device 60.

Again in mechanical terms, the lifting device 60 between the lens holder 10 and the fluid nozzle 20 is configured in such a manner that a relative movement in relation to the lens holder 10 is able to be carried out by the fluid nozzles 20, said relative movement being oriented so as to be parallel to the central axis A. The lifting device 60 has a lift drive 61 in the form of a pneumatic lifting cylinder.

Figure 2:
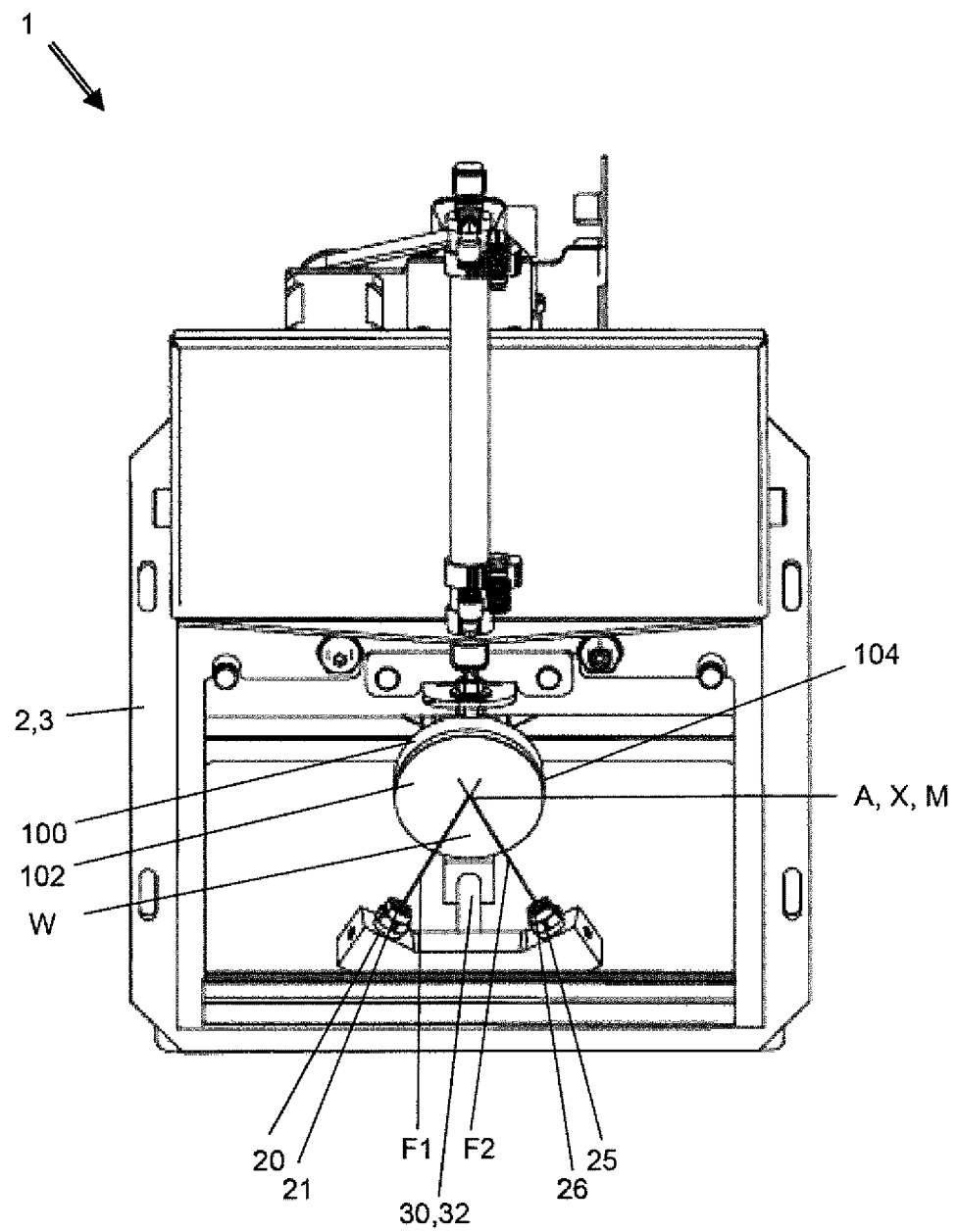
FIG. 2 shows a view from above of a protective film removal device.

Such a protective film removal device 1 is also found again in FIG. 2, wherein repetitions are dispensed with. It can be seen here that a second fluid nozzle 25 of identical construction is disposed so as to be offset from the first fluid nozzle 20 by a rotation angle W about the central axis A. The two fluid nozzles 20, 25 are fixedly connected to one another, and the rotation angle W should be between 10 and 180 degrees. The fluid jets F of the fluid nozzles 20, 25 that exit the nozzle exit ducts 21, 26 mutually converge in the intersection point with the central axis M (or at least would do so if they did not collide with the optical lens 100 beforehand).

The rotary mounting 30, by way of which the two fluid nozzles 20, 25 are pivotably mounted with a common cantilever arm 32, has a rotating range of less than 360 degrees. To this end, the rotary drive (see reference sign 33 in FIG. 1) is equipped with a direction reversal switch so as to pivot in a reciprocating manner the fluid nozzles 20, 25 about the lens holder (see reference sign 10 in FIG. 1), or the optical lens 100, by way of a rotation direction reversal. During this reciprocating pivoting, the lens holder 10 is held so as to be fixed in terms of height position relative to the machine frame 2. Moreover, the fluid nozzles 20, 25 by the lifting device (see reference sign 60 in FIG. 1) are driven so as to be movable parallel to the central axis M.

With the aid of the two fluid nozzles 20, 25, it can also be achieved that 360 degrees of the lens circumference 104 of the optical lens 100 can be swept even if a rotating range is less than 360 degrees. This is particularly advantageous in particular by virtue of the optical lens 100 being laterally mounted on the pivot arm 4, because the two fluid nozzles 20, 25 are mounted on a T-shaped end of the cantilever arm 32, and one of the two fluid nozzles 20, 25 in this way can be moved across the pivot arm 4 in both rotating directions in each case.

The two fluid nozzles 20, 25 share an infeed as shown in FIG. 1, in particular the conveying pump, the collection vessel and the cooling device (cf. FIG. 1, reference signs 50, 51, 52, 53).

Figure 3:
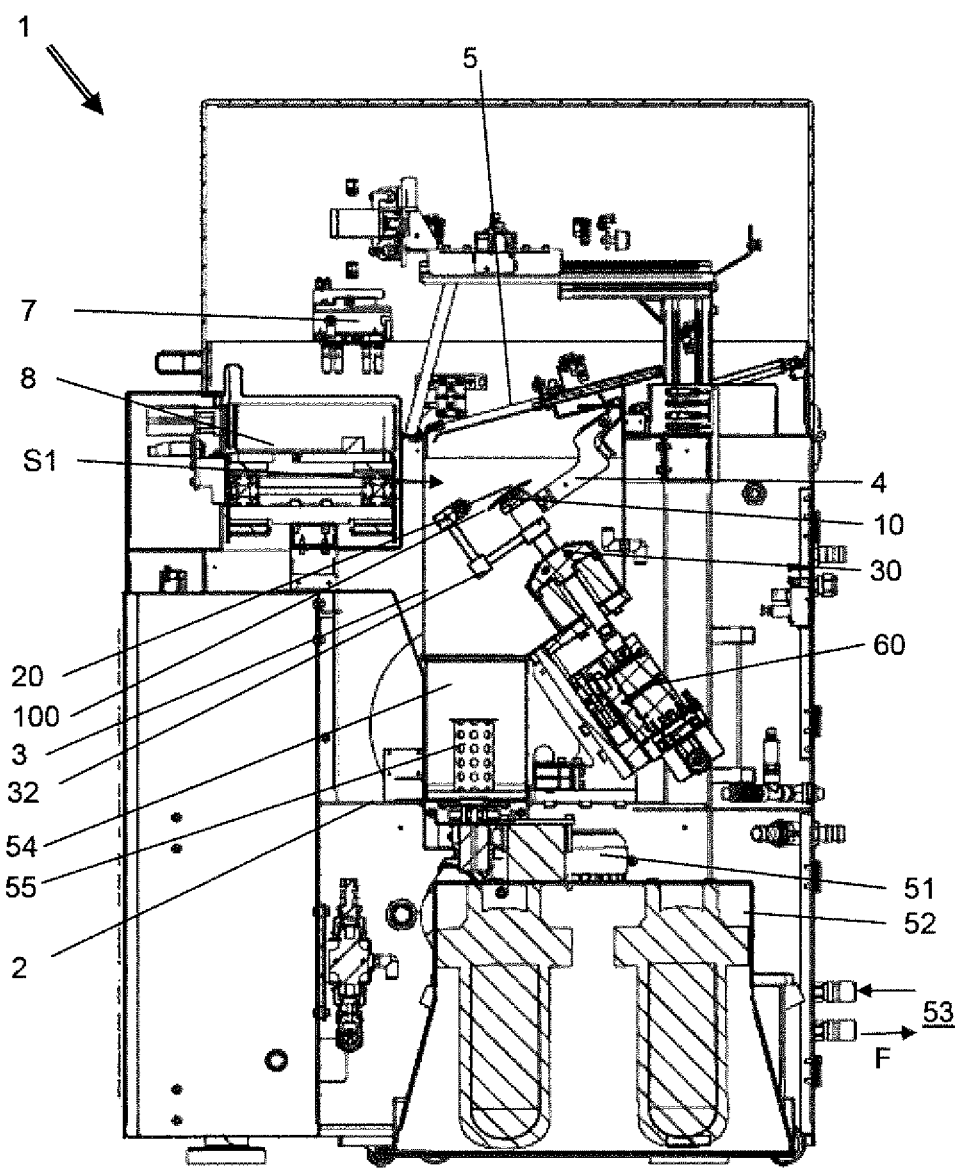
FIG. 3 shows a section through a protective film removal device.

FIG. 3 shows a section through a protective film removal device 1 having a first protective film removal station 1 which contains the component parts of FIG. 1 or 2. For reasons of clarity, only the most important components are identified, specifically the fluid nozzle 20 on the cantilever arm 32 mounted by the rotary mounting 30 and the lifting device 60, the optical lens 100 on the lens holder 10, and the machine frame 2 and the housing 3.

Further components of the infeed (see reference sign 50 of FIG. 1) can be seen below the housing 3. First, a protective film collection vessel 54 having a sieve 55 in which the protective films 102 are collected after being removed, thus adjoins below the housing 3. Said sieve for emptying can be retrieved from the protective film removal device 1 without tools. The collection vessel 52 for the fluid F is found first, in geodetical terms, below the protective film collection vessel 54. The retrieval of re-collected fluid F from the collection vessel 52 by the conveying pump 51 takes place by way of filter 56, so as to prevent clogging of the fluid nozzle 20 and abrasive particles in the fluid jet. The cooling device 53, here in particular an active cooling device 53, is incorporated in the infeed 50 by way of a bypass line. These here can be a circulation cooler behind the collection vessel 52. Alternatively, the bypass can also be connected directly to the collection vessel 52. Passive cooling, for example by cooling ribs or a heat exchanger, can be additionally provided in the infeed 50.

The loading and unloading of the lens holder 10 takes place by means of a loading and unloading device 7 in the form of a gripper which is able to be moved in a reciprocating manner between a conveyor belt 8 and the housing opening 5 in the housing 3.

Figure 4:
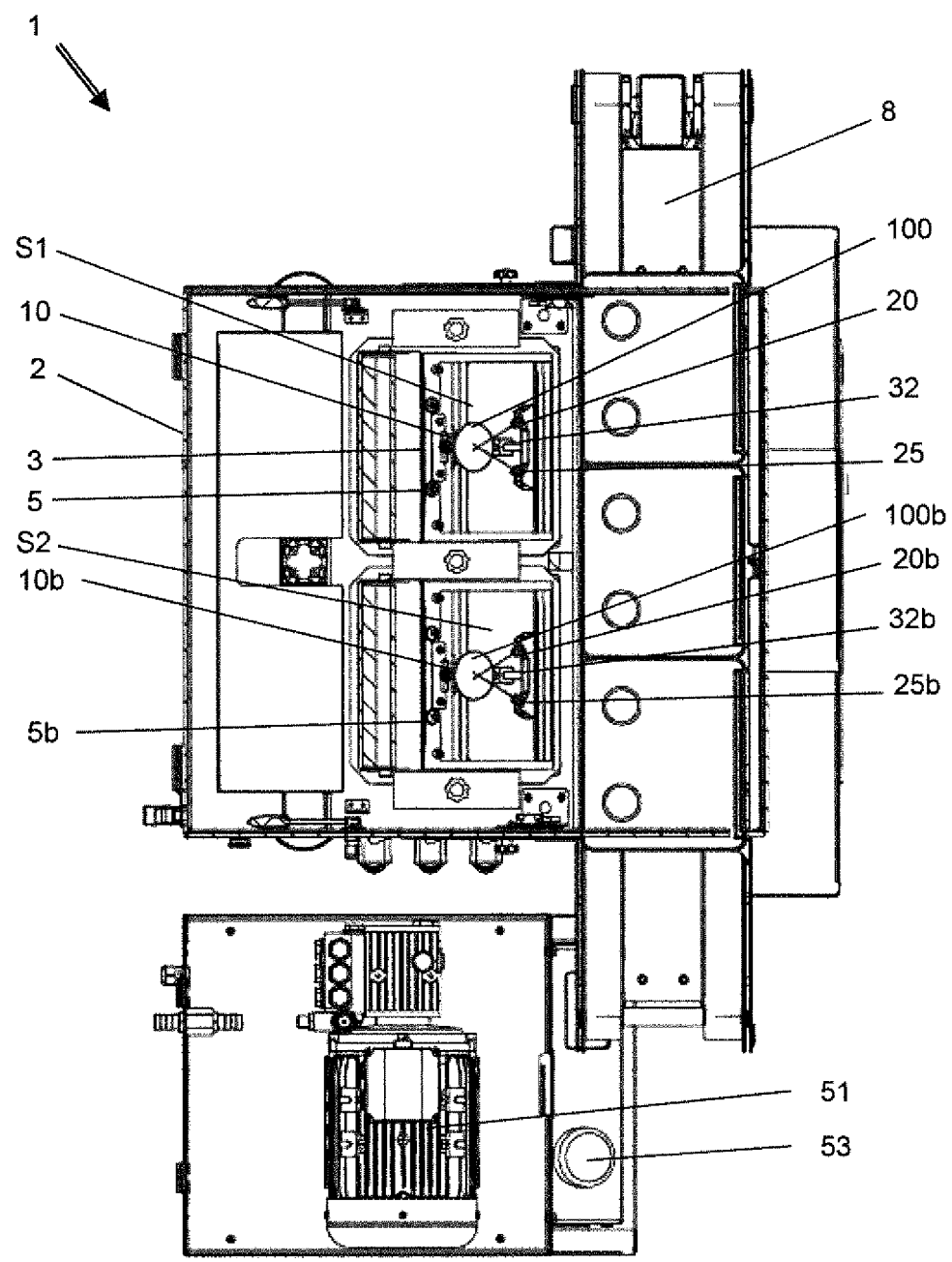
FIG. 4 shows a view from above of a protective film removal device.

FIG. 4 shows a view from above of a protective film removal device 1 which has a first removal station S1 corresponding to that of FIGS. 1, 2, and 3. Provided with reference signs here are the machine frame 2, the housing 3 having the opened housing opening 5, as well as an optical lens 100—which can be seen through this opening—on a lens holder 10, a pair of lens nozzles 20, 25 being mounted on a cantilever arm 32 so as to be pivotable or rotatable about said lens holder 10. Additionally identified are the cooling apparatus 53 and the conveying pump 51 according to FIGS. 1 and 3, and the conveyor belt 8 as is already contained in FIG. 3. The cooling apparatus 53 and the conveying pump 51, operating with high-pressure technology, sit in a decoupled housing region having a dedicated base layout so as to be isolated from vibrations from the rest of the machine.

In contrast to the embodiment as per FIGS. 1, 2 and 3, a second removal station S2, which is constructed according to the features of the first removal station S1, is illustrated for the first time here. An optical lens 100b which is held on a lens holder 10b can also be seen here through a housing opening 5b. A pair of lens nozzles 20b, 25b are mounted so as to be pivotable about the optical lens 100b by a cantilever arm 32b. In terms of the further features of the second removal station S2, reference is made to the description of the first removal station S1.

The first and the second removal station S1, S2 at least partially share the infeed, here in particular at least partially or entirely share the conveying pump, the collection vessel, the protective film collection vessel, the filters and/or the cooling device 53.

Figure 5:
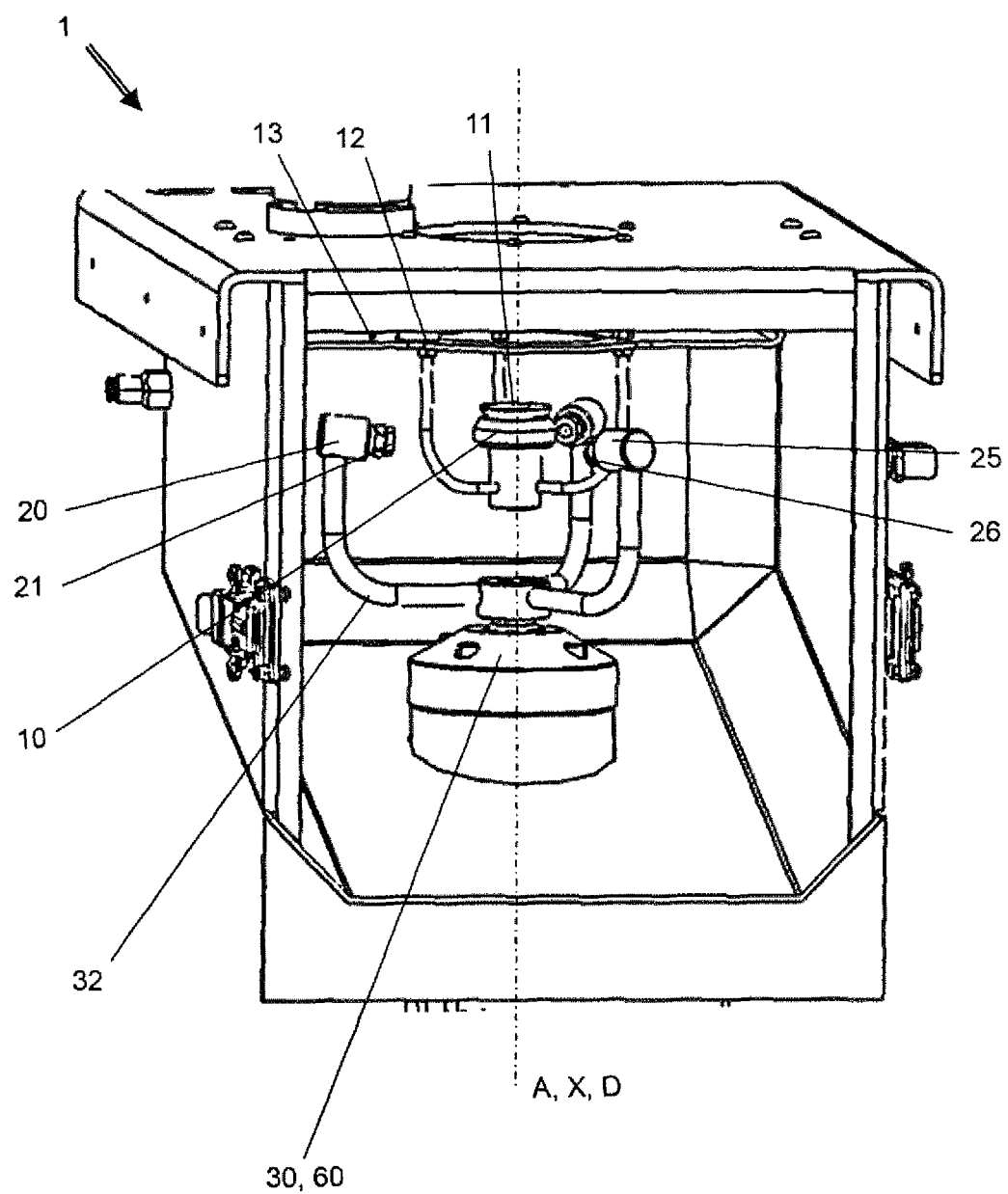
FIG. 5 shows a view of a further protective film removal device.

FIG. 5 shows a protective film removal device 1 of a different design. The latter has exactly three fluid nozzles 20, 25 having in each case one fluid exit duct 21, 26 which by way of in each case one cantilever arm 32 are connected to a rotary mounting 30 and a lifting device 60. As a result, the fluid nozzles 20, 25 in each case having inwardly directed fluid nozzles 20, 25 can be rotated about a rotation axis D, which simultaneously is the central axis M of a lens holder 10, as well as be raised and lowered along this central axis M. In operation, the central axis M typically corresponds to the lens axis X of an optical lens held in the lens holder 10. The three cantilever arms 32 of the fluid nozzles 20, 25 are disposed so as to be uniformly distributed across the circumference, and form a type of basket. The lens holder 10 sits within this basket so that the fluid nozzles 20, 25 can freely rotate about the lens holder 10. To this end, the lens holder 10 is immersed from above between the cantilever arms 32 without contacting the latter or the fluid nozzles 20, 25. A negative pressure pump 13 by way of a suction duct 12 is connected to an opening in a receptacle face 11 for fixing an optical lens by suction. The main difference to the embodiment of FIG. 1 thus lies in that no pivot arm is provided, the lens holder 10 instead being immersed between the fluid nozzles 20, 25. Moreover, the fluid nozzles 20, 25 are disposed so as to be uniformly distributed across the circumference and are able to rotate by more than 360 degrees. Nevertheless, a delimited rotation angle can also be provided here, and a direction reversal of the rotating movement can be implemented.

The schematic illustrations of FIGS. 6a, 6b and 6c show a protective film 102 being released from a first lens surface 101 of an optical lens 100 by a fluid jet F1. The optical lens 100, in addition to the first lens surface 101, has a second lens surface 103 lying opposite the latter. The first and the second lens surface 102, 103 are delimited on a lens circumference 104.

Furthermore to be seen is a fluid nozzle 20 which emits a straight, cylindrical and largely laminar fluid jet F1. The latter is oriented from the outside towards the inside in the direction of the lens axis X, and hereby is oriented slightly from above towards the first lens surface 101. The fluid nozzle 20 is driven so as to rotate or pivot about a rotation axis D which is oriented so as to be coaxial with the lens axis X.

Additionally, the fluid nozzle 20 is driven by a lifting device 60 which causes a variation in the height position parallel to the rotation axis D. It can be seen in FIG. 6a how the fluid jet F1 impacts the first lens surface 101 in front of a separation line L between the first lens surface 101 and the protective film 102. According to FIG. 6b, the fluid nozzle 20 by the lifting device 60 is moved slightly upwards, and the fluid jet F1 impacts the separation line L precisely between the first lens surface 101 and the protective film 102. As a result of the fluid nozzle 20 being further lifted by the lifting device 60 according to FIG. 6c, the fluid jet F1 travels beyond the separation line L, pushes down a folded-over end of the protective film 102, and herein exerts tension on the separation line L. The fluid nozzle 20 can now be lowered again and subsequently be lifted again in a manner corresponding to FIGS. 6a, 6b and 6c. The fluid nozzle 20 is simultaneously pivoted or rotated about a rotary mounting 30 about the lens axis X. In such a pivoting or rotating movement and a superimposed oscillating lifting movement, the separation line L is displaced ever further in the direction of the lens axis X, until said separation line has been completely released. The rotating movement preferably has a rotation direction reversal, and the fluid nozzle 20 will pivot in a reciprocating manner between two terminal positions. The number of lifting movements preferably exceeds the number of rotating direction reversals, preferably at least by a factor of three.

The invention is not limited to one of the embodiments described above but can be modified in many ways.

All features and advantages derived from the claims, the description and the drawing, including structural details, spatial arrangements and method steps, can be relevant to the invention individually as well as in the most varied combinations.

| List of reference signs | |
|---|---|
| 1 | Protective film removal device |
| 2 | Machine frame |
| 3 | Housing |
| 4 | Pivot arm |
| 5 | Housing opening |
| 6 | Closure element |
| 7 | Loading and unloading device |
| 8 | Conveyor belt |
| 10 | Lens holder |
| 11 | Receptacle face |
| 12 | Suction duct |
| 13 | Negative-pressure pump |
| 20 | Fluid nozzle |
| 21 | Nozzle exit duct |
| 25 | Fluid nozzle |
| 26 | Nozzle exit duct |
| 30 | Rotary mounting |
| 31 | Rotary bearing |
| 32 | Cantilever arm |
| 33 | Rotary drive |
| 50 | Infeed |
| 51 | Conveying pump |
| 52 | Collection vessel |
| 53 | Cooling device |
| 54 | Protective film collection vessel |
| 55 | Sieve |
| 56 | Filter |
| 60 | Lifting device |
| 61 | Lift drive |
| 100 | Optical lens or lens blank |
| 101 | First lens surface |
| 102 | Protective film |
| 103 | Second lens surface |
| 104 | Lens circumference |
| A | Central axis |
| D | Rotation axis |
| F | Fluid |
| F1 | Fluid jet |
| F2 | Fluid jet |
| L | Separation line |
| S1 | First removal station |
| S2 | Second removal station |
| W | Rotation angle |
| X | Lens axis |
| Features pertaining to the second removal station: | |
| 5b | Housing opening |
| 10b | Lens holder |
| 20b | Fluid nozzle |
| 25b | Fluid nozzle |
| 32b | Cantilever arm |
| 100b | Second optical lens or second lens blank |

The invention claimed is:

1. A protective film removal device (1) having a first removal station (S1) for releasing a protective film (102) from a first lens surface (101) of an optical lens (100),
 having a lens holder (10),
  wherein the lens holder (10) has a central axis (A),
 having at least one fluid nozzle (20, 25) having a nozzle exit duct (21, 26), and
 having a rotary mounting (30) between the lens holder (10) and the fluid nozzle or fluid nozzles (20, 25),
  wherein the rotary mounting (30) is configured in such a manner that a relative movement about the central axis (A) is able to be carried out by the fluid nozzle or fluid nozzles (20, 25), wherein the nozzle exit duct (21, 26) of the fluid nozzles (20, 25) is in each case oriented inwards,
characterized in that
 the lens holder (10) is disposed so as to be rotationally fixed, and the fluid nozzle or fluid nozzles (20, 25) is/are in each case disposed so as to be rotatable around the rotary mounting (30) building a nozzle carousel by way of which the fluid nozzle or fluid nozzles (20, 25) is/are rotated about the lens holder (10),
 a lifting device (60) between the lens holder (10) and the fluid nozzle or fluid nozzles (20, 25) is configured in such a manner that a relative movement in relation to the lens holder (10), said relative movement being oriented along the central axis (A), is able to be carried out by the fluid nozzle or fluid nozzles (20), wherein the lens holder (10) is disposed so as to be fixed in terms of the height position, and the fluid nozzle or fluid nozzles (20, 25) is/are driven by the lifting device (60) so as to be movable along the central axis (A).

2. The protective film removal device (1) according to claim 1, characterized in that the nozzle exit duct or nozzle exit ducts (21) is/are in each case configured in such a manner that said nozzle exit duct or nozzle exit ducts generate an at least substantially straight jet of fluid (F).

3. The protective film removal device (1) according to claim 1, characterized in that the nozzle exit duct or nozzle exit ducts (21, 26) is/are in each case fed with fluid (F) by way of an infeed (50), wherein a conveying pump (51) and/or a cooling device (53) for cooling the fluid (F) are/is disposed in the infeed (50).

4. The protective film removal device (1) according to claim 1, characterized in that the nozzle exit duct or nozzle exit ducts (21, 26), with the exception of the rotary mounting (30), has/have in each case a static angle.

5. The protective film removal device (1) according to claim 1, characterized in that the rotary mounting (30) has a rotary bearing (31) and thereon a cantilever arm (32) or a disc, wherein the fluid nozzle or the fluid nozzles (20, 25) is/are in each case established on the cantilever arm (32) or the disc.

6. The protective film removal device (1) according to claim 1, characterized in that the rotary mounting (30) has a delimited rotating range.

7. The protective film removal device (1) according to claim 1, characterized in that the rotary mounting (30) is disposed between the lifting device (60) and the fluid nozzle or fluid nozzles (20, 25).

8. The protective film removal device (1) according to claim 1, characterized in that said protective film removal device (1) has at least two fluid nozzles (20, 25).

9. The protective film removal device (1) according to claim 1, characterized in that said protective film removal device (1) has at least two fluid nozzles (20, 25), wherein one of the at least two fluid nozzles (25) is disposed so as to be offset from another of the at least two fluid nozzles (20) by a defined rotation angle (W) about the central axis (A).

10. The protective film removal device (1) according to claim 1, characterized in that said protective film removal device (1) has a second removal station (S2) for, simultaneously with the first removal station (S1), releasing a protective film from a lens surface of a second optical lens (100b),
 having a lens holder (10b),
  wherein the lens holder (10b) has central axis,
 having at least one fluid nozzle (20b, 25b),
  wherein each of the fluid nozzles (20b, 25b) has a nozzle exit duct, and
 having a rotary mounting between the lens holder (10b) and the fluid nozzle or fluid nozzles (20b),
  wherein the rotary mounting (20b) is configured in such a manner that a relative movement about the central axis is able to be carried out by the fluid nozzle or fluid nozzles (20*b*, 25*b*), wherein the nozzle exit duct of the fluid nozzles (20*b*, 25*b*) is in each case oriented inwards, characterized in that a lifting device between the lens holder (10*b*) and the fluid nozzle or fluid nozzles (20*b*, 25*b*) is configured in such a manner that a relative movement in relation to the lens holder (10*b*), said relative movement being oriented along the central axis, is able to be carried out by the fluid nozzle or fluid nozzles (20*b*, 25*b*).

11. The protective film removal device (1) according to claim 1, characterized in that the lens holder (10) has a receptacle face which bears the optical lens.

12. The protective film removal device (1) according to claim 1, characterized in that the lifting device is configured in such a manner that the relative movement in relation to the lens holder (10), said relative movement being oriented along the central axis is carried out in an oscillating manner by the fluid nozzle or fluid nozzles (20, 25).

13. The protective film removal device (1) according to claim 6, characterized in that the delimited rotating range of the rotary mounting (30) is less than 360 degrees.

14. The protective film removal device (1) according to claim 1, characterized in that the rotary mounting (30) is disposed between the lifting device (60) and the fluid nozzle or fluid nozzles (20, 25) such that the rotary mounting (30) is moved conjointly with the lifting device.

* * * * *